United States Patent
Sugiyama et al.

(10) Patent No.: US 6,332,441 B1
(45) Date of Patent: Dec. 25, 2001

(54) ASSEMBLING ARRANGEMENT FOR TENSIONER AND HYDRAULIC CONTROL VALVE

(75) Inventors: Izumi Sugiyama; Toshiyuki Satou; Kensuke Nakamura, all of Saitama (JP)

(73) Assignee: Honda Giken Kogyo, Tokyo (JP)

( * ) Notice: Subject to any disclaimer, the term of this patent is extended or adjusted under 35 U.S.C. 154(b) by 0 days.

(21) Appl. No.: 09/507,462

(22) Filed: Feb. 22, 2000

(30) Foreign Application Priority Data

Feb. 22, 1999 (JP) .................................................. 11-042687
Feb. 22, 1999 (JP) .................................................. 11-043491

(51) Int. Cl.[7] ....................................................... F01L 1/02
(52) U.S. Cl. .................................. 123/90.31; 123/90.12; 123/195 C; 123/198 E
(58) Field of Search ............................. 123/90.12, 90.31, 123/195 A, 195 C, 195 S, 198 E, 90.33, 90.37, 90.38, 196 R

(56) References Cited

U.S. PATENT DOCUMENTS

| | | | |
|---|---|---|---|
| 4,190,025 | * 2/1980 | Wahl | 123/90.31 |
| 4,879,981 | * 11/1989 | Matsumoto | 123/196 R |
| 5,154,144 | * 10/1992 | Okui et al. | 123/90.31 |
| 5,293,845 | * 3/1994 | Yamazaki et al. | 123/90.31 |
| 5,333,578 | * 8/1994 | Shimura et al. | 123/90.31 |
| 5,732,667 | * 3/1998 | Sakurai | 123/90.31 |
| 5,797,363 | * 8/1998 | Nakamura | 123/90.31 |
| 5,860,402 | * 1/1999 | Sakurai et al. | 123/196 R |
| 5,934,234 | * 8/1999 | Shichinohe et al. | 123/90.31 |
| 6,189,499 | * 2/2001 | Iwata et al. | 123/196 R |

* cited by examiner

Primary Examiner—Teresa Walberg
Assistant Examiner—Fadi H. Dahbour
(74) Attorney, Agent, or Firm—Armstrong, Westerman, Hattori, McLeland & Naughton, LLP

(57) ABSTRACT

A tensioner for a camshaft driving chain (a plunger device 17 shown in the first embodiment of the invention) and a hydraulic control valve 21 are disposed close to each other. An oil passage 31 for supplying an oil pressure to the tensioner is caused to branch off from a downstream side of an oil filter 27 provided at an inlet port 28 of the hydraulic control valve. With this construction, the arrangement of the oil passage can be simplified, and therefore not only can man hours required for forming the oil passage be reduced, but also the number of components required can also be reduced by commonizing the oil filter. Accordingly, it is possible to provide an improved assembling arrangement for a tensioner and a hydraulic control valve in an internal combustion engine without involving an increase in production costs.

21 Claims, 6 Drawing Sheets

ASSEMBLING ARRANGEMENT FOR TENSIONER AND HYDRAULIC CONTROL VALVE

BACKGROUND OF THE INVENTION

The present invention relates to an assembling arrangement for a tensioner and a hydraulic control valve in an internal combustion engine. In addition, the present invention relates to an oil passage arrangement for supplying an oil pressure to a tensioner for a camshaft driving chain. Further, the present invention relates to a mounting structure of a hydraulic control valve in the internal combustion engine.

In engines in which the rotation of a crankshaft is transmitted to a camshaft via a chain/sprocket mechanism, an engine is known which uses a tensioner using a plunger adapted to be pushed out by virtue of oil pressure in order to maintain the tension of a chain constant (refer to Japanese Utility Model Registration No. 2503434).

A tensioner such as described above, however, requires an oil passage to be formed so as to supply an oil pressure for imparting a thrust to the plunger in response to the slackness of the chain and an oil filter to be provided so as to prevent the intrusion of sludge or the like into the oil passage so formed. This construction has created a need for reducing production costs of such engines. This is a first problem in the conventional technique.

In addition, an engine has been put into practical use which is provided with a variable valve train as hydraulically controlled equipment in which intake and exhaust valve operation timings are automatically variable in response to the running condition of the engine, and cars equipped with the variable valve train are already sold in the market place.

This variable valve train is adapted to select connection or disconnection between a plurality of rocker arms pivotally supported on a rocker shaft using a switch-over device for hydraulic operations, and this valve train requires a control valve for connecting and/or disconnecting the oil pressure to be applied to the switch-over device and an oil passage for supplying the oil pressure to the switch-over device via the control valve (refer to JP-B-9-10104U).

In the aforesaid prior art, the control valve is attached to an end surface of a cylinder head on a transmission side thereof or an end surface opposite to a mounting surface where a camshaft driving mechanism is mounted.

An engine compartment of a small-sized car is more spacious in a transverse direction than in a longitudinal direction, and therefore, with a transversely mounted engine in which the crankshaft is made parallel with the axle, the serviceability for maintenance can be secured by providing the control valve on an end surface of the cylinder head on a transmission side in a direction of the crankshaft, or an end surface opposite to a mounting surface where the camshaft driving mechanism is mounted. With a longitudinally mounted engine in which the crankshaft is disposed perpendicular to the axle, considering the serviceability for maintenance in the engine compartment, it is difficult to provide the control valve on the rear end surface of the cylinder head in the crankshaft direction or on the end surface on the transmission side.

It is further difficult to mount the control valve on the side of the cylinder head or cylinder block where in intake manifold and the exhaust manifold are mounted at a position causing no problem with servicing for maintenance. In addition, if the control valve were to be so mounted, it will tend to result in the enlargement of the engine in size.

It is possible to try to provide the control valve at a position spaced away from the engine main body, but if such is tried, it will inevitably result in an increase in man hours for production. This is a second problem in the conventional technique.

SUMMARY OF THE INVENTION

The present invention was made with a view to solving the problems inherent in the conventional technique.

An object of a first aspect of the present invention is to provide an assembling arrangement for a tensioner and a hydraulic control valve in an internal combustion engine which is an improvement without involving an increase in the production costs.

In addition, an object of a second aspect of the present invention is to provide an oil passage arrangement for a tensioner that is improved without involving an increase in the production costs.

Further, an object of a third aspect of the present invention is to provide a mounting arrangement for a hydraulic control valve which is mountable on a cylinder head for an internal combustion engine without causing any problems in servicing for maintenance or involving an increase in man hours required for production.

The object of the first aspect of the present invention can be achieved by an assembling arrangement for a tensioner and a hydraulic control valve in an internal combustion engine, the assemblying arrangement comprising:

the tensioner, adapted to operate by virtue of the pressure of a lubricating oil, for applying tension to a camshaft driving chain; and the hydraulic control valve, disposed close to said tensioner, for controlling an oil pressuresent to an equipment which is operated by virtue of the pressure of the lubricating oil, wherein an oil passage for supplying an oil pressure to the tensioner is branched off from a downstream side of an oil filter provided at an inlet port of the hydraulic control valve.

The object of the second aspect of the present invention can be achieved by an oil passage arrangement for a tensioner, wherein a tensioner for a camshaft driving chain and a hydraulic control valve are disposed close to each other, and an oil passage for supplying an oil pressure to the tensioner is caused to branch off from a downstream side of an oil filter provided at an inlet port of the hydraulic control valve.

With these constructions according to the first and second aspects of the invention, the assembly arrangement, particularly the arrangement of the oil passage, can be simplified, and therefore, not only can man hours required for forming the oil passage be reduced, but also the number of components required can also be reduced by commonizing the oil filter. Moreover, the provision of the oil filter at the inlet port of the hydraulic control valve can securely prevent the intrusion of foreign matter into the hydraulic control valve and the tensioner. Furthermore, since the length of the oil pressure supply passage for the tensioner can be minimized, the response of the tensioner can be improved.

In particular, with an arrangement in which the hydraulic control valve is provided above the tensioner such that oil flows into the tensioner from thereabove, since the oil is prevented from being drained from the oil passage leading to the tensioner when the engine is stopped, air can be prevented from entering into the oil passage.

The object of the third aspect of the present invention can be achieved by a mounting structure of a hydraulic control valve in the internal cumbustion engine, wherein a casing portion adapted to accommodate therein a part of a driving mechanism for interlockingly rotating a crankshaft and camshafts is formed integrally with a cylinder head, and that a mounting portion of a hydraulic control valve and an opening of oil passages adapted to extend through the hydraulic control valve are provided in the casing portion.

With this construction, it is possible to mount the control valve at a position that does not interfere with the intake manifold and the exhaust manifold, and therefore, it is possible to secure high serviceability for maintenance. Moreover, the control valve can easily be connected to the oil passages formed in the cylinder head, and therefore, an increase in man hours required for production can be avoided. In particular, with a longitudinally mounted engine, on the side of the cylinder head where the exhaust manifold is mounted, generally the exhaust manifold is caused to extend in a direction in which the exhaust manifold is farther away from the end surface where the camshaft driving mechanism is mounted, the construction is advantageous in securing a required margin for the space for servicing for maintenance.

DETAILED DESCRIPTION OF THE PREFERRED EMBODIMENTS

Hereinafter, a first embodiment of the present invention will be explained.

Figure 1:
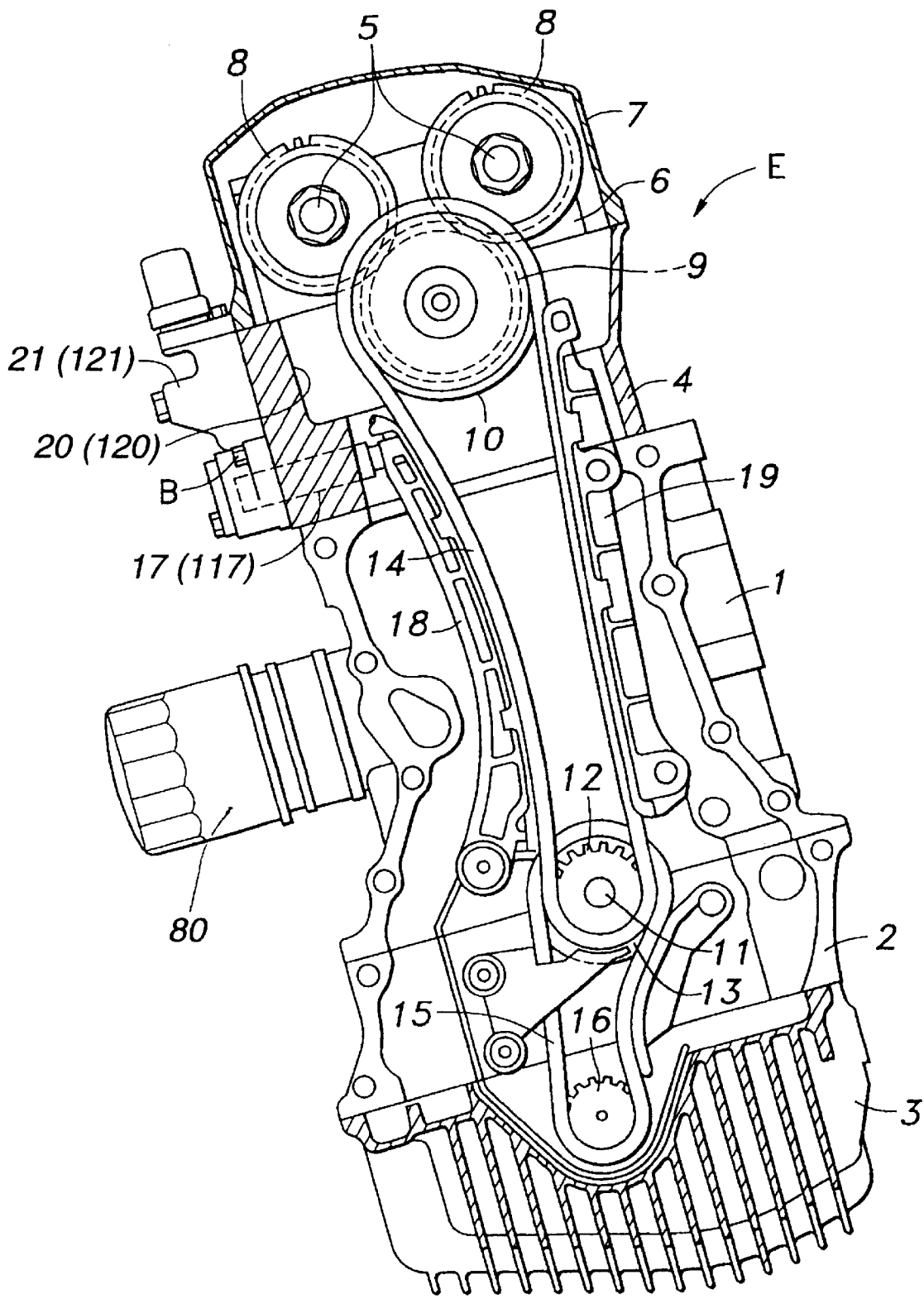
FIG. 1 is an elevation showing an inline multiple-cylinder engine to which the present invention is applied, the engine being partially cut away on a crank pulley side thereof.

FIG. 1 is an elevation showing an inline multiple-cylinder internal combustion engine to which the present invention is applied, the engine begin partially cut away on a crank pulley side thereof. This engine E comprises a cylinder block 1 comprising, in turn, a plurality of cylinders arranged in line, a bearing cap block 2 joined to a lower surface of the cylinder block 1, an oil pan 3 joined to a lower surface of the bearing cap block 2, and a cylinder head 4 joined to an upper surface of the cylinder block 1. A cam holder 6 rotatably supporting two camshafts 5 is provided above the cylinder head 4, and these camshafts 5 are covered with a head cover 7 joined to an upper surface of the cylinder head 4.

Cam gears 8 are securely fitted on ends of the two camshafts 5, respectively. These cam gears 8 are then brought into mesh engagement with a common idle gear 9 rotatably secured to an end surface of the cylinder head 4 on the crank pulley side thereof. A driven sprocket 10 for the camshafts is integrally joined to the idle gear 9.

As with the known engine, a crankshaft 11 is supported at a joint surface between the cylinder block 1 and the bearing cap block 2 by means of main bearings.

Securely fitted on the crankshaft 11 are a camshaft drive sprocket 12 and an oil pump drive sprocket 13. These drive sprockets 12, 13 are connected respectively to separate silent chains 14, 15 via the camshaft driven sprocket 10 and a driven sprocket 16 for the oil pump. With this construction, the camshafts 5 made integral with the cam gears 8 are driven by the crankshaft 11 via the idle gear 9 made integral with the camshaft driven sprocket 10, and in synchronism with this, an oil pump, not shown, is driven.

A tensioner shoe 18 adapted to be pressed by virtue of the thrust of the hydraulic plunger device 17 is additionally provided on a slack side (a left-hand side as seen in the figure) of the silent chain 14 extended between the camshaft driven sprocket 10 and the drive sprocket 12, and a guide shoe 19 for preventing the run-out of the silent chain 14 is provided on a stretched side (a right-hand side as seen in the figure) of the same chain. With this construction, the tension of the camshaft driving silent chain 14 is automatically adjusted so as to remain constant at all times, and moreover, the excessive run-out of the same chain is also prevented.

Integrally formed on the crank pulley side end portion of the cylinder head 4 are the idle gear 9, the camshaft driven sprocket 10 and a sprocket casing portion 20 for accommodating therein a part of the silent chain 14 that is wound around the sprocket. Then, a hydraulic control valve 21 for intermittently controlling an oil pressure sent to a valve operating state variable device, not shown, is attached to a left-hand side of the sprocket casing portion together with the hydraulic plunger device 17 as seen in FIG. 1.

The hydraulically operated valve operating state variable device is a known technology that has already been realized on vehicles sold in the market place (refer to JP-B-6-10104U), so that a description thereof will be omitted here.

Figure 2:
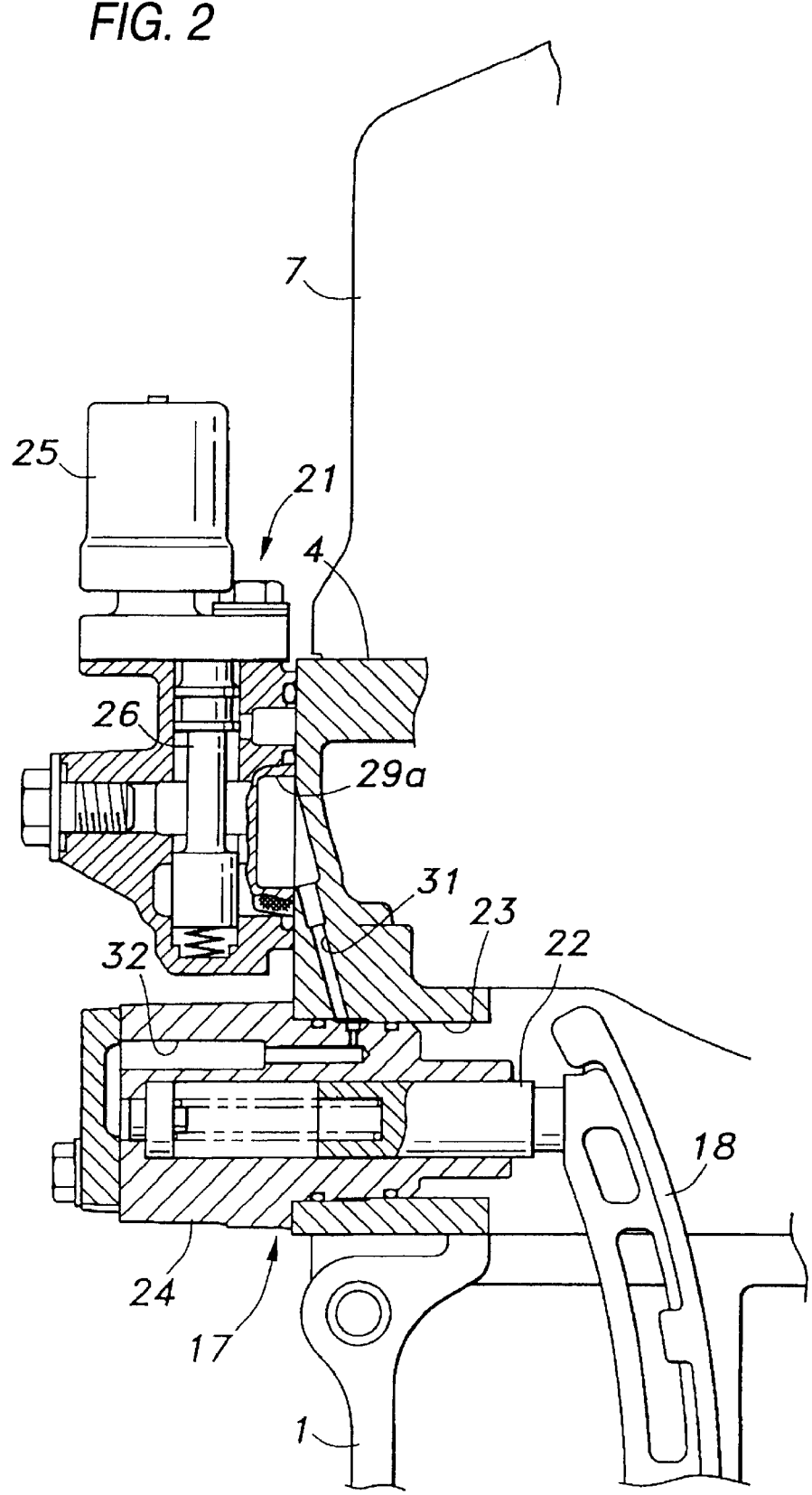
FIG. 2 is a vertical sectional view of a main part of the invention.

As shown in FIG. 2, the hydraulic plunger device 17 and the hydraulic control valve 21 are both disposed close to each other at an end of the cylinder head 4 or on the same side of the sprocket casing portion 20 with the hydraulic control valve 21 being positioned higher. Here, it is desirable that the tensioner 17 and the hydraulic control valve 21 are disposed close to each other such that any other component cannot be disposed at least between the two members, and even with a maximum space being provided therebetween, it is desirable that the tensioner 17 and the hydraulic control valve 21 are spaced away from each other to such an extent that for instance, a member of the same size as that of those two members cannot be interposed therebetween.

The hydraulic plunger device 17 comprises a plunger 22 for imparting a thrust to an upper end of the tensioner shoe 18 pivotally secured to the cylinder block 1 at a lower end thereof and a plunger body 24 securely fitted in a fitting hole 23 formed in the cylinder head 4 in a state in which the plunger 22 is slidably fitted therein and secured to the cylinder head 4 with a bolt B. Thus, the tensioner for maintaining constant the tension of the camshaft driving silent chain 14 is constituted by the hydraulic plunger device 17 and the tensioner shoe 18.

Figure 3:
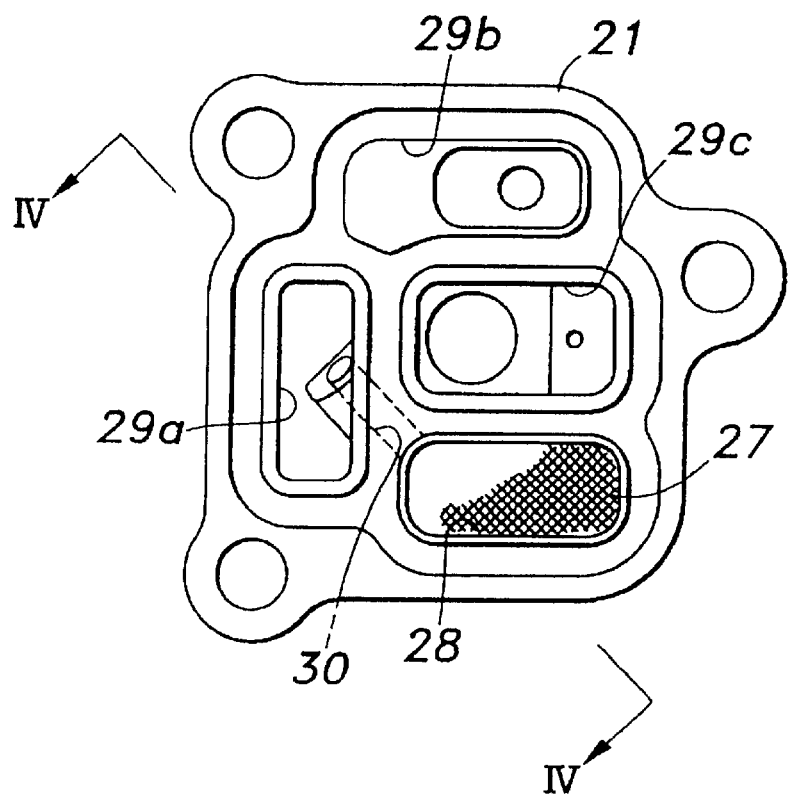
FIG. 3 is an end view of a joint surface of a hydraulic control valve relative to a cylinder head.
Figure 4:
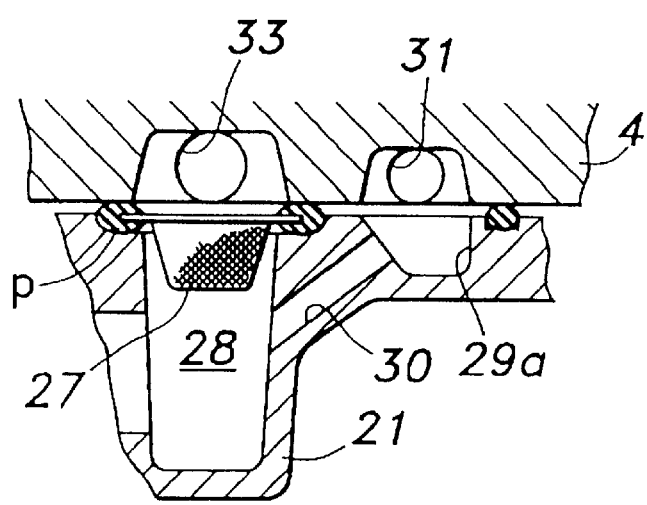
FIG. 4 is a partial sectional view taken along the line IV—IV in FIG. 3.

The hydraulic control valve 21 is constructed such that a communicating state between oil passages inside the same control valve are switched over by means of a spool valve 26 adapted to be moved in vertical directions in response to the operation of a solenoid valve 25. As shown in FIGS. 3 and 4, made to open to a joint surface of the hydraulic control valve 21 relative to the cylinder head 4 is an inlet port 28 in which an oil filter 27 is provided which comprises a woven metal screen of appropriate mesh and three outlet ports 29a, 29b, 29c. A communication is established at all times between the inlet port 28 and one of the outlet ports, or the outlet port 29a which is contiguous with the inlet port 28 via an inclined passage 30 formed through drilling.

Here, the oil filter 27 is interposed at a joint surface between the cylinder head 4 and the hydraulic control valve 21 via a rubber packing, this allowing the oil filter to be so assembled very easily. In addition, the mesh portion of the oil filter 27 is formed such that it protrudes into the inlet port 28, whereby both the securement of a required area for the mesh portion and miniaturization of the hydraulic control valve 21 are attained.

A downwardly inclined oil passage 31 is formed by drilling in such a manner as to be directed to the fitting hole 23 in the plunger body from a position confronting one of the outlet ports, or the outlet port 29 formed in the mounting surface of the hydraulic control valve 21 on the side of the cylinder head 4.

An oil passage 32 is formed in the plunger body 24 in such a manner as to communicate with the downwardly inclined oil passage 31 for allowing an oil pressure to be applied to the plunger 22.

The oil passage 31 is formed linearly in the cylinder head.

A part of the oil flowing from an oil supply passage 33 provided in the cylinder head 4 to the inlet port 28 via the oil filter 27 flows into one of the outlet ports, or the outlet port 29a via the inclined passage 30 caused to branch off from the inlet port 28 irrespective of the operating condition of the hydraulic control valve 21. Then, the oil flows into the oil passage 32 inside the plunger body via the downwardly inclined oil passage 31, whereby a certain oil pressure is applied to the plunger 22. Here, since the oil filter 27 is provided in the inlet port 28 of the hydraulic control valve 21, the intrusion of foreign matters into both the hydraulic control valve 21 and the hydraulic plunger device 17 can securely be prevented. Moreover, since the distance of the oil passage for supplying the oil pressure to the hydraulic plunger device 17 is constructed so as to become shortest, the response of the hydraulic plunger device 17 can be improved. the hydraulic control valve 21. Then, the oil flows into the oil passage 32 inside the plunger body via the downwardly inclined oil passage 31, whereby a certain oil pressure is applied to the plunger 22. Here, since the oil filter 27 is provided in the inlet port 28 of the hydraulic control valve 21, the intrusion of foreign matters into both the hydraulic control valve 21 and the hydraulic plunger device 17 can securely be prevented. Moreover, since the distance of the oil passage for supplying the oil pressure to the hydraulic plunger device 17 is constructed so as to become shortest, the response of the hydraulic plunger device 17 can be improved.

The hydraulic control valve is provided directly above the tensioner. As has been described heretofore, the required oil supply to the hydraulic plunger device 17 can be effected from thereabove by disposing the hydraulic control valve 21 above the hydraulic plunger device 17 as just described above, whereby the oil is prevented from totally being drained from the oil passage 31 without providing a complicated oil passage arrangement, thereby making it possible to avoid a risk of air being sucked into the hydraulic plunger device 17.

The tensioner and the hydraulic control valve are provided on an exhaust manifold side of an engine, and an extending portion of an exhaust manifold cover is provided between the tensioner and hydraulic control valve and an exhaust manifold.

Figure 5:
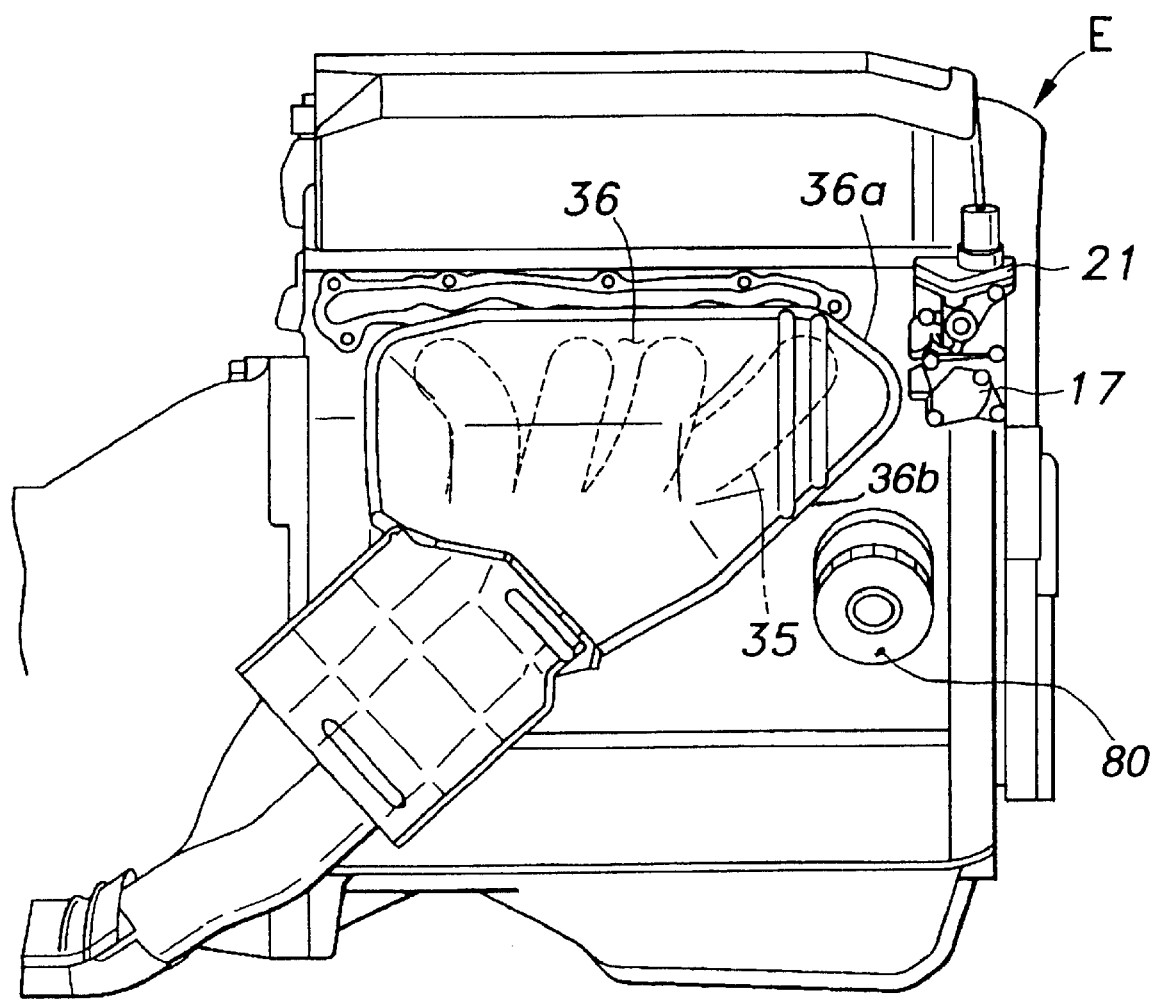
FIG. 5 is a schematic side view of an exhaust side of the inline multiple-cylinder engine to which the present invention is applied.

As shown in FIG. 5, both the hydraulic plunger device 17 and the hydraulic control valve 21 are disposed close to the exhaust manifold 35, but since the frontward extending portion of the exhaust manifold cover 36 acts as a heat shield plate, the heat effect both on the hydraulic plunger device 17 and the hydraulic control valve 21 can be relieved without increasing the number of components. In addition, in this embodiment, since the hydraulic plunger device 17 and the hydraulic control valve 21 are to be mounted on the same side of the sprocket casing portion 20 that is formed integrally with an end portion of the cylinder No. 1 side of the cylinder head 4, it is possible to secure a mounting space and increase the serviceability for maintenance without increasing the size of the engine.

A main oil filter 80 mounted on the cylinder block is provided on the exhaust manifold side of the engine as in the case with the hydraulic control valve, and an extending portion 36b of the exhaust manifold cover is provided between the exhaust manifold and the main oil filter.

Referring to the accompanying drawings of FIGS. 1, 5, 6, 7 and 8, a construction according to the second embodiment of the present invention will be described in detail below.

In the second embodiment, a detailed explanation regarding elements which are respectively the same in structure or function as the first embodiment will be eliminated by utilizing the same reference numerals.

As shown in the drawing, a hydraulic control valve mounting portion 122 having formed therein a mounting bolt hole T1 for a hydraulic control valve 121 and a plunger device mounting portion 123a having formed therein a mounting bolt hole T2 and fitting hole 123 for a hydraulic plunger device 117 are disposed vertically so as to be adjacent to each other on a side of a sprocket casing portion 120 in a cylinder head . Made to open to the hydraulic control valve mounting portion 122 are, respectively, an oil passage 124 for distributing oil sent under pressure from an oil pump to an inlet port 121a of the hydraulic control valve 121, an oil passage 125 for distributing oil from one of the outlet ports or the outlet port 121b of the hydraulic control valve 121 to a cam holder 6, and an oil passage 126 for distributing oil from another outlet port (not shown) of the hydraulic control valve 121 to the fitting hole 123 of the plunger device 117.

Figure 6:
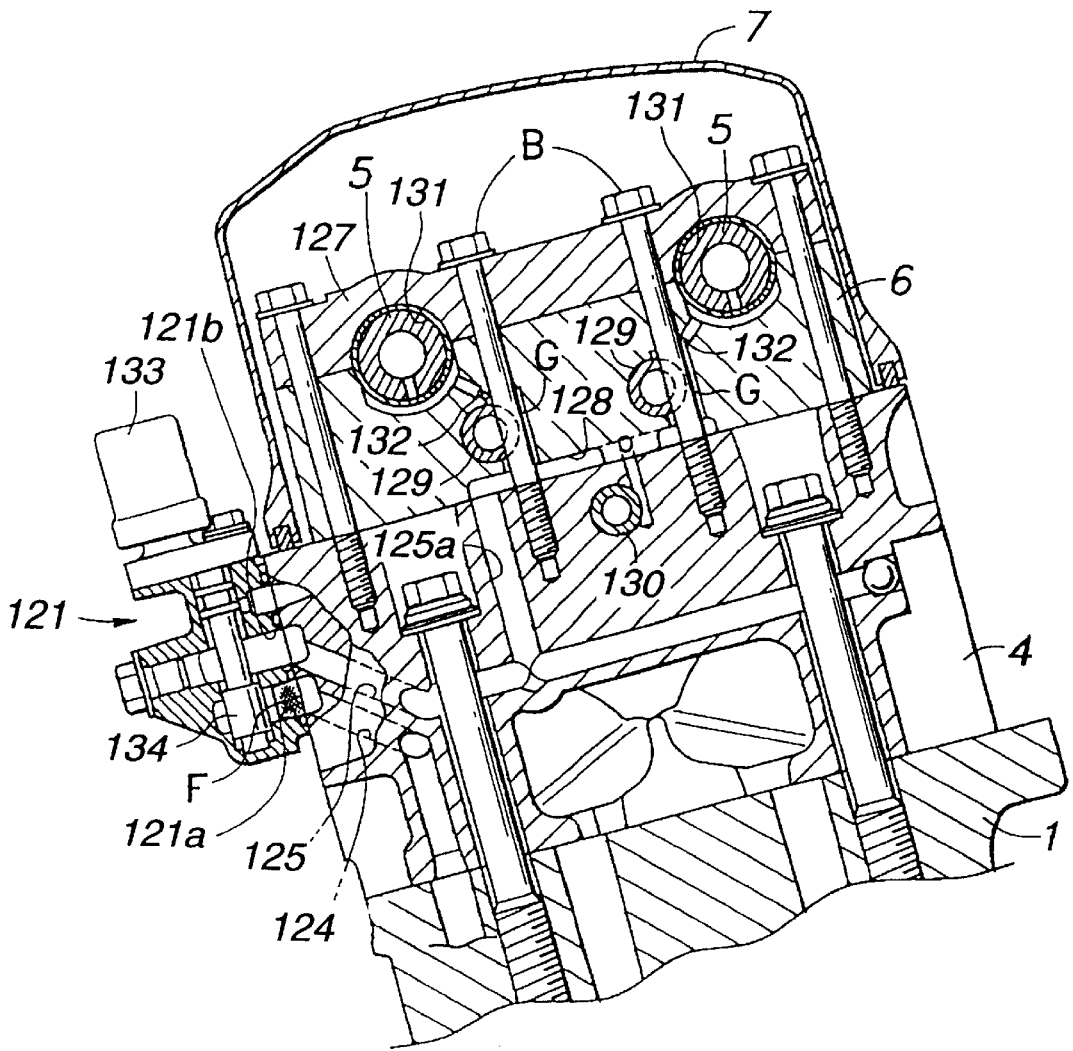
FIG. 6 is a vertical sectional view showing a main part of the present invention.
Figure 7:
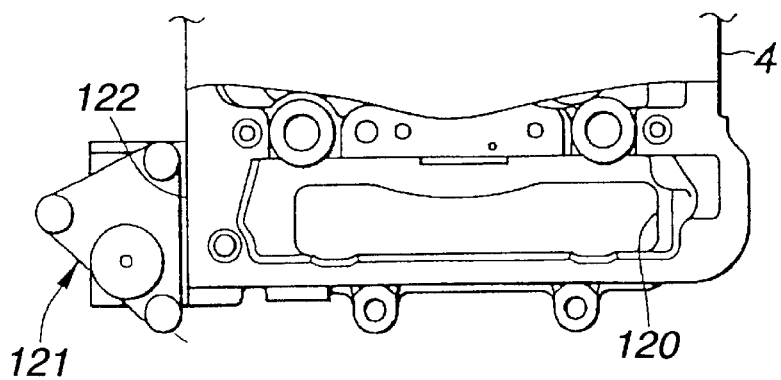
FIG. 7 is a plan view of a front end side of a cylinder head.
Figure 8:
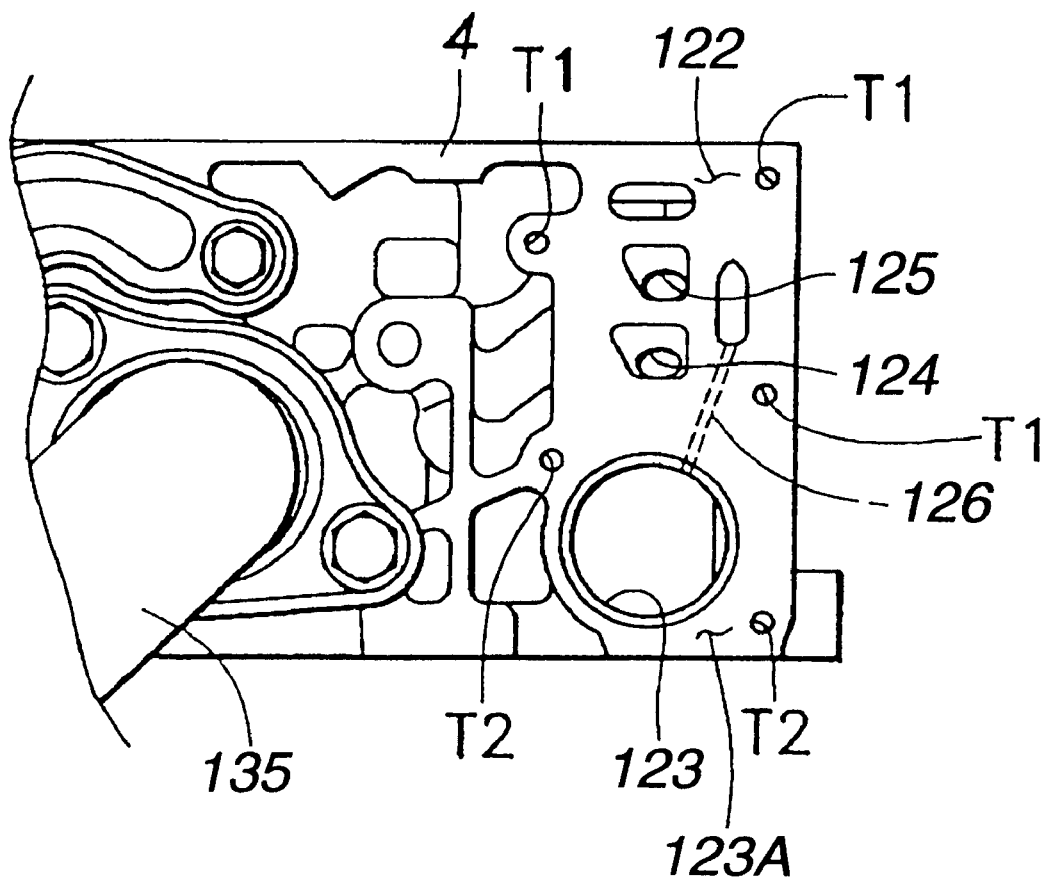
FIG. 8 is a side view of the front end side of the cylinder head.

As shown in FIG. 6, a vertical hole portion 125a of the oil passage 125 formed in the cylinder head 4 for distributing oil to the cam holder 6 is made to open to a joint surface between the cylinder head 4 and the cam holder 6, in other words, an upper surface of the cylinder head 4. An oil distribution groove 128 is provided by forming a recessed portion from a position aligning with the opening of the vertical hole portion 125a to a portion corresponding to two bolts B of fastening bolts for tightly fastening a camshaft bearing cap 127 which is screwed in place between the two camshafts 5. This oil distribution groove 128 is caused to communicate with hollow holes of two rocker shafts 129 via gaps G formed in respective insertion holes of the two bolts B, as well as a supporting shaft 130 of an idle gear 9 so as to supply a certain oil pressure to the variable valve train and a lubricating oil between the idle gear 9 and the supporting shaft 130. In addition, the gaps G in the insertion holes for the bearing cap fastening bolts B are caused to communicate, respectively, with bearing holes 131 of the two camshafts 5 via orifices 132. insertion holes of the two bolts B, as well as a supporting shaft 130 of an idle gear 9 so as to supply a certain oil pressure to the variable valve train and a lubricating oil between the idle gear 9 and the supporting shaft 130. In addition, the gaps G in the insertion holes for the bearing cap fastening bolts B are caused to communicate, respectively, with bearing holes 131 of the two camshafts 5 via orifices 132.

As described above, since the oil distribution groove 128 is formed in the joint surface between the cam holder 6 and the cylinder head 4, the same groove can easily be formed.

The hydraulic control valve 121 is constructed such that the communicating condition between the oil passages therein is switched over by means of a spool valve 134 adapted to be moved vertically in response to the operation of a solenoid valve 133. In addition, a leak passage (not shown) is provided in the hydraulic control valve 121 for supplying a predetermined volume of oil to the bearing holes 131 of the two camshafts 5 at all times irrespective of the operation of the spool valve 134.

Oil sent under pressure from the oil pump flows into the hydraulic control valve 121 via an oil filter F comprising a woven metal screen of an appropriate mesh which oil filter is provided in the inlet port 121a of the hydraulic control valve 121, and is then supplied to the bearing holes 131 of the two camshafts 5 via the leak passage, the oil passage 125 for the cam holder, the oil distribution groove 128, the gaps G and the orifices 132, irrespective of the operating condition of the hydraulic control valve 121. In synchronism with this, the oil is also supplied to the plunger device 117 via the oil passage 26 communicating with another outlet port.

When the spool valve 134 is opened, a large volume of oil flows into the hollow holes of the rocker shafts 129 from the outlet port 121b via the oil passages for operating the variable valve train, not shown, provided on the rocker shafts 129. When this happens, the predetermined volume of oil is supplied to the bearing holes 131 of the two camshafts 5 via the orifices 132.

Similarly with the first embodiment, the known technologies (those disclosed in JP-B-6-10104 or the like) can be applied to the variable valve train without any modification, and therefore, a description thereof will be omitted herein.

In the second embodiment of the invention, the hydraulic control valve 121 is described as being provided on the exhaust manifold mounting side of the sprocket casing portion 120, but the hydraulic control valve 121 may be provided on the intake manifold mounting side or camshaft driving mechanism mounting side thereof.

Thus, according to the present invention, the oil passage for supplying the oil pressure to the tensioner device is constructed so as to branch off from the inlet port of the hydraulic control valve where the oil filter is provided, the arrangement of the oil passage is simplified, whereby not only the man hours for work required for the formation of the oil passage and the number of components can be reduced by using the oil filter commonly. Moreover, the oil filter is provided in the inlet port of the hydraulic control valve, this securely preventing the intrusion of foreign matters into the tensioner. Furthermore, the distance of the oil passage for supplying the oil pressure to the tensioner can be made shortest, this improving the response of the tensioner. In addition, according to a second feature of the invention, the oil is prevented from being drained from the oil passage leading to the tensioner when the engine is stopped, this preventing air from being sucked into the oil passage.

Thus, according to the present invention, since the hydraulic control valve is constructed so as to be mounted on the casing portion for the camshaft driving mechanism, the hydraulic control valve so mounted does not interfere with the intake manifold or exhaust manifold, and moreover, since the hydraulic control valve can be provided at a position round the cylinder head that normally becomes a dead space, it is possible to secure high serviceability for maintenance with high space utility. Furthermore, since the connection between the hydraulic control valve and the oil passages formed in the cylinder head can easily be effected, no risk of increasing the man hours required for production can be involved. In particular, with the hydraulic control valve being provided on the exhaust manifold mounting side, since in general, the exhaust manifold is caused to extend in a direction in which it becomes farther away from the camshaft driving mechanism mounting side, with an inline multiple-cylinder engine being disposed longitudinally, the arrangement of the hydraulic control valve according to the present invention is advantageous in securing spacious room for servicing the hydraulic control valve for maintenance.

What is claimed is:

1. An assembling arrangement for a tensioner and a hydraulic control valve in an internal combustion engine, said assemblying arrangement compromising:

the tensioner, adapted to operate by virtue of the pressure of a lubricating oil, for applying tension to a camshaft driving chain; and the hydraulic control valve, disposed close to said tensioner, for controlling an oil pressure sent to an equipment which is operated by virtue of the pressure of said lubricating oil, wherein an oil passage for supplying an oil pressure to said tensioner is branched off from a downstream side of an oil filter provided at an inlet port of said hydraulic control valve, and wherein said hydraulic control valve is provided above said tensioner so that the oil flows into said tensioner from thereabove.

2. The assembling arrangement as set forth in claim 1, wherein said hydraulic control valve is provided directly above said tensioner.

3. The assembling arrangement as set forth in claim 1, wherein said oil passage is formed linearly in a cylinder head.

4. An assembling arrangement for a tensioner and a hydraulic control valve in an internal combustion engine, said assemblying arrangement compromising:

the tensioner, adapted to operate by virtue of the pressure of a lubricating oil, for applying tension to a camshaft driving chain; and the hydraulic control valve, disposed close to said tensioner, for controlling an oil pressure sent to an equipment which is operated by virtue of the pressure of said lubricating oil, wherein an oil passage for supplying an oil pressure to said tensioner is branched off from a downstream side of an oil filter provided at an inlet port of said hydraulic control valve, and wherein said tensioner and said hydraulic control valve are provided on an exhaust manifold side of the engine, and an extending portion of an exhaust manifold cover is provided between said tensioner and an exhaust manifold and also between said hydraulic control valve and said exhaust manifold.

5. An assembling arrangement for a tensioner and a hydraulic control valve in an internal combustion engine, said assemblying arrangement compromising:
   the tensioner, adapted to operate by virtue of the pressure of a lubricating oil, for applying tension to a camshaft driving chain; and
   the hydraulic control valve, disposed close to said tensioner, for controlling an oil pressure sent to an equipment which is operated by virtue of the pressure of said lubricating oil,
   wherein an oil passage for supplying an oil pressure to said is branched off from a downstream side of an oil filter provided at an inlet port of said hydraulic control valve, and
   wherein said oil passage is formed linearly in a cylinder head.

6. An assembling arrangement for a tensioner and a hydraulic control valve in an internal combustion engine, said assemblying arrangement compromising:
   the tensioner, adapted to operate by virtue of the pressure of a lubricating oil, for applying tension to a camshaft driving chain; and
   the hydraulic control valve, disposed close to said tensioner, for controlling an oil pressure sent to an equipment which is operated by virtue of the pressure of said lubricating oil,
   wherein an oil passage for supplying an oil pressure to said tensioner is branched off from a downstream side of an oil filter provided at an inlet port of said hydraulic control valve, and
   wherein a sprocket casing portion adapted to accommodate therein a part of a driving mechanism for interlockingly rotating a crankshaft and camshafts is formed integrally with a cylinder head, and wherein a mounting portion of said hydraulic control valve and an opening of an oil passage adapted to extend through said hydraulic control valve are provided in said sprocket casing portion.

7. The assembling arrangement as set forth in claim 6, wherein said tensioner and said hydraulic control valve are mounted to said sprocket casing portion which is formed integrally with said cylinder head, said sprocket casing portion accommodating therein said driving mechanism.

8. An assembling arrangement for a tensioner and a hydraulic control valve in an internal combustion engine, said assemblying arrangement compromising:
   the tensioner, adapted to operate by virtue of the pressure of a lubricating oil, for applying tension to a camshaft driving chain; and
   the hydraulic control valve, disposed close to said tensioner, for controlling an oil pressure sent to an equipment which is operated by virtue of the pressure of said lubricating oil,
   wherein an oil passage for supplying an oil pressure to said tensioner is branched off from a downstream side of an oil filter provided at an inlet port of said hydraulic control valve, and
   wherein a sprocket casing portion adapted to accommodate therein a part of a driving mechanism of interlockingly rotating a crankshaft and camshafts is formed integrally wit a cylinder head, and wherein a mounting portion of said hydraulic control valve and an opening of an oil passage adapted to extend through said hydraulic control valve are provided on a side of said sprocket casing portion where an exhaust manifold is to be mounted.

9. The assembling arrangement as set forth in claim 8, wherein said tensioner and said hydraulic control valve are provided on an exhaust manifold side of an engine, and an extending portion of an exhaust manifold cover is provided between said tensioner and an exhaust manifold and also between said hydraulic control valve and said exhaust manifold.

10. An assembling arrangement for a tensioner and a hydraulic control valve in an internal combustion engine, said assemblying arrangement compromising:
    the tensioner, adapted to operate by virtue of the pressure of a lubricating oil, for applying tension to a camshaft driving chain; and
    the hydraulic control valve, disposed close to said tensioner, for controlling an oil pressure sent to an equipment which is operated by virtue of the pressure of said lubricating oil,
    wherein an oil passage for supplying an oil pressure to said tensioner is branched off from a downstream side of an oil filter provided at an inlet port of said hydraulic control valve, and
    wherein said tensioner and said hydraulic control valve are mounted to a sprocket casing portion which is formed integrally with a cylinder head, said sprocket casing portion accommodating therein a driving mechanism.

11. An assembling arrangement for a tensioner and a hydraulic control valve in an internal combustion engine, said assemblying arrangement compromising:
    the tensioner, adapted to operate by virtue of the pressure of a lubricating oil, for applying tension to a camshaft driving chain; and
    the hydraulic control valve, disposed close to said tensioner, for controlling an oil pressure sent to an equipment which is operated by virtue of the pressure of said lubricating oil,
    wherein an oil passage for supplying an oil pressure to said tensioner is branched off from a downstream side of an oil filter provided at an inlet port of said hydraulic control valve, and
    wherein a main oil filter mounted on a cylinder block and said hydraulic control valve are provided on the exhaust manifold side of the engine, and wherein an extending portion of an exhaust manifold cover is provided between said exhaust manifold and said main oil filter.

12. An assembling arrangement for a tensioner and a hydraulic control valve in an internal combustion engine, said assemblying arrangement comprising:
    the tensioner, adapted to operate by virtue of the pressure of a lubricating oil, for applying tension to a camshaft driving chain; and
    the hydraulic control valve, disposed close to said tensioner, for controlling an oil pressure sent to an equipment which is operated by virtue of the pressure of said lubricating oil,
    wherein an oil passage for supplying an oil pressure to said tensioner is branched off from a downstream side of an oil filter provided at an inlet port of said hydraulic control valve,
    wherein said hydraulic control valve is provided above said tensioner so that the oil flows into said tensioner from threabove, and
    wherein a mesh portion of said oil filter is protruded into said inlet port.

13. The assembling arrangement as set forth in claim 12, wherein said tensioner and said hydraulic control valve are mounted to said sprocket casing portion (accommodating therein said driving mechanism) which is formed integrally with said cylinder head.

14. The assembling arrangement as set forth in claim 12, wherein a sprocket casing portion adapted to accommodate therein a part of a driving mechanism for interlockingly rotating a crankshaft and camshafts is formed integrally with a cylinder head, and wherein a mounting portion of said hydraulic control valve and an opening of an oil passage adapted to extend through said hydraulic control valve are provided in said sprocket casing portion.

15. The assembling arrangement as set forth in claim 12, wherein a sprocket casing portion adapted to accommodate therein a part of a driving mechanism for interlockingly rotate a crankshaft and camshafts is formed integrally with a cylinder head, and wherein a mounting portion of said hydraulic control valve and an opening of an oil passage adapted to extend through said hydraulic control valve are provided on a side of said sprocket casing portion where an exhaust manifold is to be mounted.

16. The assembling arrangement as set forth in claim 12, wherein said tensioner and said hydraulic control valve are provided on an exhaust manifold side of an engine, and an extending portion of an exhaust manifold cover is provided between said tensioner and an exhaust manifold and also between said hydraulic control valve and said exhaust manifold.

17. The assembling arrangement as set forth in claim 12, wherein a main filter mounted on said cylinder block is provided on the exhaust manifold side of the engine as in the case with said hydraulic control valve, and wherein an extending portion of an exhaust manifold cover is provided between said exhaust manifold and said main oil filter.

18. An assembling arrangement for a tensioner and a hydraulic control valve in an internal combustion engine, said assemblying arrangement comprising:

the tensioner, adapted to operate by virtue of the pressure of a lubricating oil, for applying tension to a camshaft driving chain; and the hydraulic control valve, disposed close to said tensioner, for controlling an oil pressure sent to an equipment which is operated by virtue of the pressure of said lubricating oil, wherein an oil passage for supplying an oil pressure to said tensioner is branched off from a downstream side of an oil filter provided at an inlet port of said hydraulic control valve, wherein said hydraulic control valve is provided above said tensioner so that the oil flows into said tensioner from thereabove, and wherein said hydraulic control valve is provided directly above said tensioner, and wherein said oil passage is formed linearly in a cylinder head.

19. An assembling arrangement for a tensioner and a hydraulic control valve in an internal combustion engine having a camshaft, a camshaft driving chain and an oil pressure-operated equipment ancillary to said tensioner said assembling arrangement comprising:

said tensioner being disposed for applying tension to said camshaft driving chain;

said hydraulic control valve being disposed close to said tensioner in said engine and including an inlet port, an oil filter provided at said inlet port and means to selectively control oil pressure to be supplied to said equipment;

wherein an oil passage for supplying oil pressure to said tensioner is formed as an oil passage branched off from a downstream side of said oil filter.

20. The assembling arrangement as set forth in claim 19, wherein a mesh portion of said oil filter is protruded into said inlet port.

21. An assembling arrangement for a tensioner and a hydraulic control valve in an internal combustion engine having a camshaft, a camshaft driving chain and an oil pressure-operated equipment ancillary to said tensioner, said assembling arrangement comprising;

said tensioner being disposed for applying tension to said camshaft driving chain;

said hydraulic control valve being disposed close to said tensioner in said engine and including an inlet port, wherein an oil passage for supplying oil pressure to said tensioner is formed as one of a plurality of oil passages branched off from said inlet port of said control valve.

* * * * *